Jan. 13, 1970 W. N. COX 3,490,055

CIRCUIT SCRUCTURE WITH CAPACITOR

Filed Jan. 16, 1967 3 Sheets-Sheet 1

INVENTOR

BY WALTER N. COX

Jack Larsen

ATTORNEY

Jan. 13, 1970 W. N. COX 3,490,055

CIRCUIT SCRUCTURE WITH CAPACITOR

Filed Jan. 16, 1967 3 Sheets-Sheet 2

INVENTOR

BY WALTER N. COX

Jack Larsen

ATTORNEY

CIRCUIT SCRUCTURE WITH CAPACITOR

Filed Jan. 16, 1967 3 Sheets-Sheet 3

INVENTOR
BY WALTER N. COX
Jack Larsen
ATTORNEY

United States Patent Office 3,490,055
Patented Jan. 13, 1970

3,490,055

CIRCUIT STRUCTURE WITH CAPACITOR

Walter N. Cox, Maynard, Mass., assignor to Microtek Electronics Inc., a corporation of Massachusetts Filed Jan. 16, 1967, Ser. No. 609,533
Int. Cl. H03h 7/10
U.S. Cl. 333—70 22 Claims

ABSTRACT OF THE DISCLOSURE

A layer of ductile palladium metal interposed completely between a barium titanate ceramic film and a substrate of alumina prevents cracking of the titanate film when it is colled after being fired to 1350 degrees C. to form a high-k dielectric body. By applying a second electrode over the improved ceramic film a reliable capacitor with high capacitance is formed. The improvement may require adding a cross-over insulator to carry a connection to the upper plate over the exposed edge of the palladium metal plate. The invention achieves compatibility between capacitors and hybrid circuitry based on palladium-glass technology.

Figure 1:
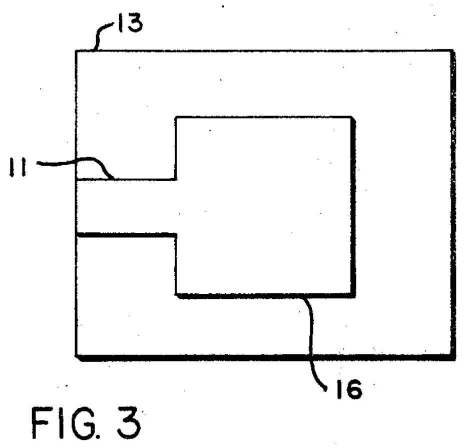

This invention relates to capacitors and more particularly to resistor-capacitor networks of the so called "thick-film" or "hybrid" type. Thick film circuits prefer ably are produced by depositing special frits in the desired pattern of conductive and resistive parts by a silk-screen process (or similar method) on a ceramic substrate (usually aluminum oxide) and firing the frits to produce a permanently interconnected network. By this technique, the production of resistors having a wide range of resistances is easily achieved; however production of high values of capacitance on the same substrate has been difficult. High capacitance values are achieved by using a ferro-electric material such as barium (or barium-strontium) titanate in a ceramic laid down between two conductive plates. When attempts have been made in the prior art to produce highest values of capacitance by using such high-dielectric constant titanate materials (hereinafter referred to as "high-k" ceramics) laid down in very thin layers, the resulting product has often proved to be unreliable because of a marked difference in the thermal coefficient of expansion between the high-k ceramic and the substrate material. If the thermal expansion of the high-k and the substrate ceramics were matched, the difficulties would be minimized; but it turns out that the known high-k ceramics have much greater coefficients of thermal expansion than materials which have been found suitable as substrates for resistors. Since aluminum oxide ceramic has high strength, high thermal conductivity, high electrical resistivity, and low density and dielectric constant, (all desirable characteristics in a micro-circuit substrate) it is the substrate material usually employed. The disparity of thermal expansion between the high-k ceramics and the aluminum oxide is particularly great at temperatures greater than 500 degrees centigrade, at which the circuits are fired, and at which sintered high-k ceramics are deposited. These high-k materials are characteristically weak in tensile strength and are brittle and, therefore, subject to easy fracture. When high-k ceramic capacitors applied to hybrid substrates according to the prior art are in a cooling cycle, specifically after sintering, they tend to contract much more than the aluminum oxide substrate. This tends to open up cracks in the high-k dielectrics particularly at boundaries of the high-k dielectric with the substrate and with electrode layers. If cracks do not form at this time, stresses may be developed which at a subsequent time may be relieved by opening cracks or propagating existing cracks.

In any case, the resulting structure is electrically weak and unreliable.

It is an object of the present invention to reduce the stresses imposed in the high-k material on cooling and to convert the reduced stresses to forces of compression rather than tension. It is a further object and consequence of the above mentioned object to eliminate cracks and potential cracks from the high-k material. A feature by which the above objects are achieved is a structure wherein a layer of ductile metal that has high melting point and is low in chemical reactivity is interposed to provide a cushion between the high-k ceramic and the substrate and also to serve as the lower plate for the capacitor. Another feature of the invention is the use of a different material in an insulation crossover to carry on interconnection from a circuit on the substrate to an upper plate applied over the high-k ceramic. Other objects of the invention will in part be obvious and will in part appear hereinafter.

The invention accordingly comprises a product possessing the features, properties, and the relation of components which will be exemplified in the product hereinafter described, and the scope of the invention will be indicated in the claims.

Figure 2:
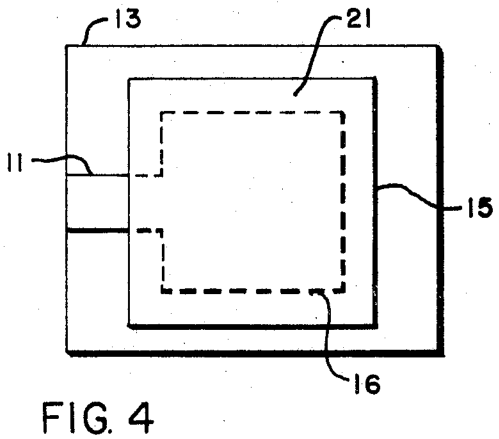
Figure 3:
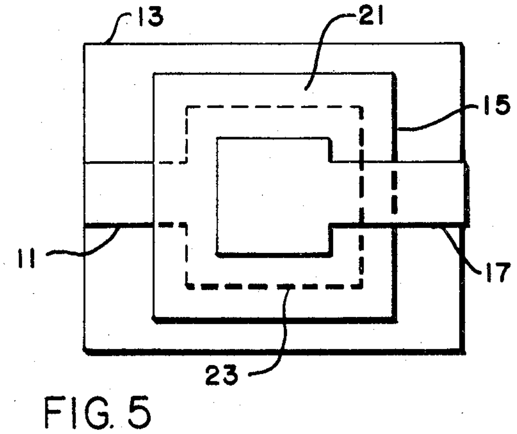
Figure 4:
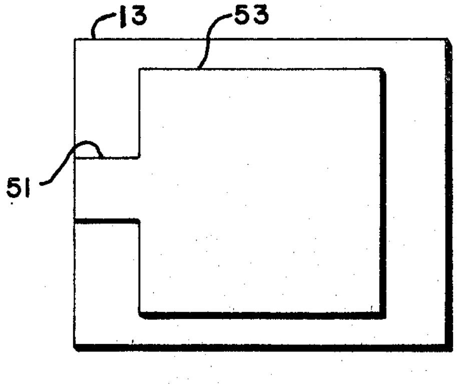
Figure 5:
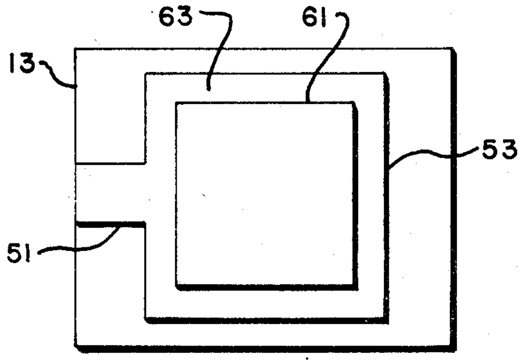
Figure 6:
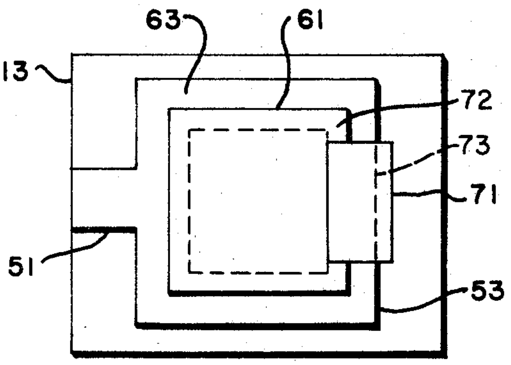
Figure 7:
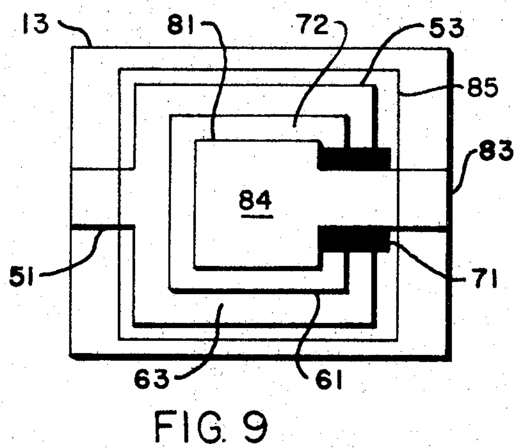
Figure 8:
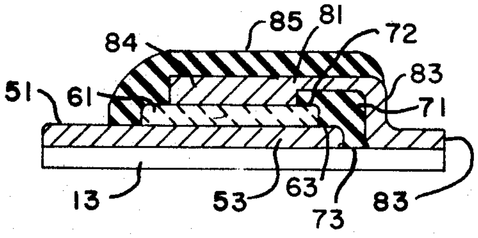
Figure 9:
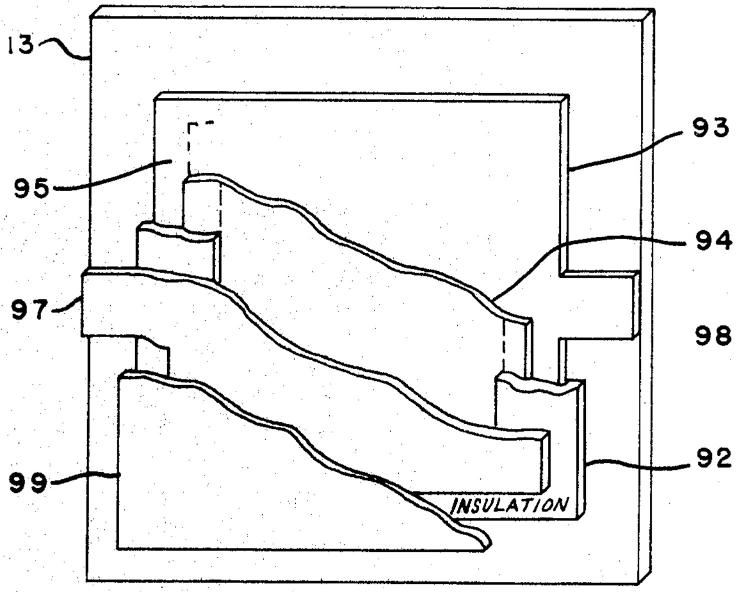
Figure 10:
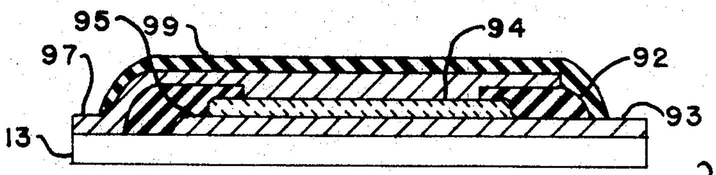
Figure 11:
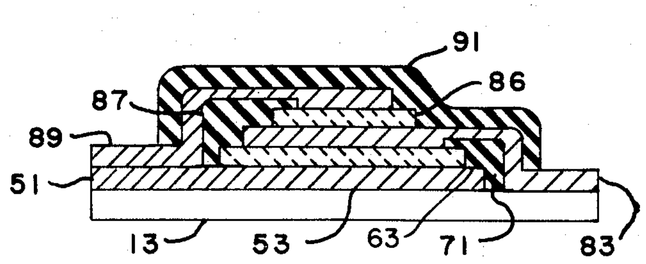
Figure 12:
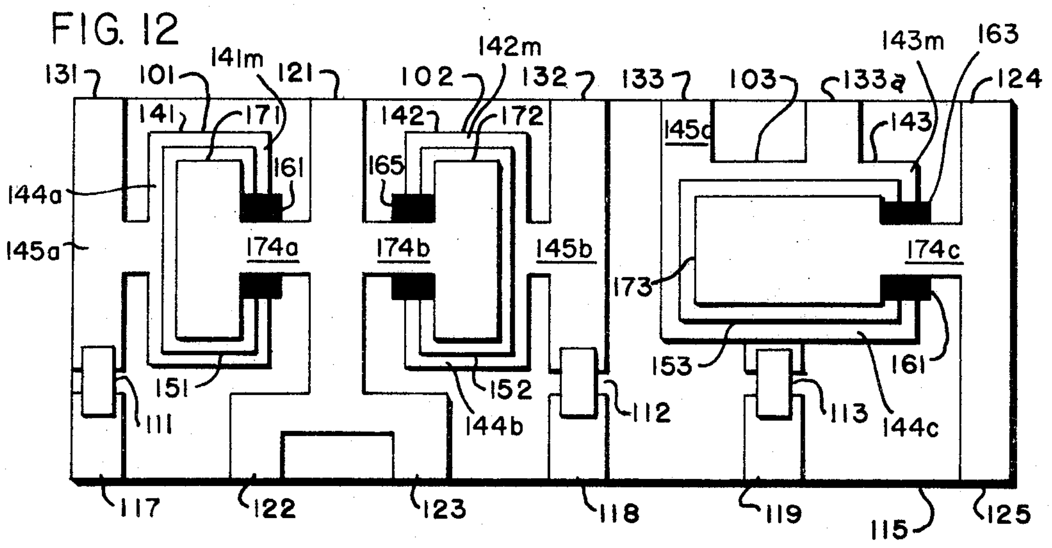
Figure 13:
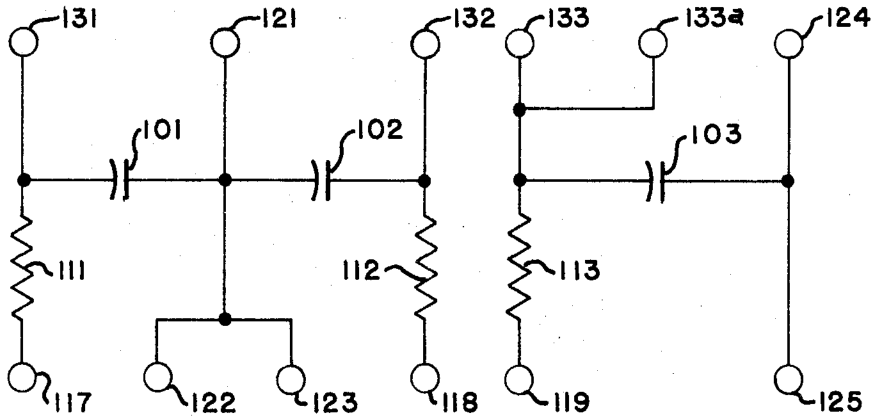

For a fuller understanding of the nature and objects of the invention reference should be had to the following detailed description taken in connection with the accompanying drawings, in which:

FIG. 1 represents the first step in the production of a capacitor in accordance with the prior art, FIG. 2 represents a further step in that production, FIG. 3 represents a completed capacitor in accordance with the prior art, FIG. 4 shows the deposit of the lower electrode including a base plate for a capacitor in accordance with the present invention, FIG. 5 represents the extent of the high-k layer then put over the base plate, FIG. 6 shows the deposit of the novel insulation cross-over and, FIG. 7 represents the deposit of the upper electrode and encapsulant all in accordance with the present invention, FIG. 8 is a cross section through the structure of FIG. 7, FIG. 9 shows an alternative construction of the insulation crossover, FIG. 10 is a cross section through the construction of FIG. 9, FIG. 11 is a cross section through a multi-layered capacitor structure in accordance with the invention, FIG. 12 represents a resistor-capacitor network according to the invention, and FIG. 13 is the schematic drawing of the device of FIG. 12.

In accordance with the prior art as illustrated by the FIGS. 1–3 a lower electrode 11 is laid down on the substrate 13 in a predetermined pattern. A layer 15 of high-k material is laid down over the electrode 11 fully covering the predetermined plate portion 16 of the electrode; and finally the top electrode 17 is deposited over the high-k layer 15 in such a way that no point of the top electrode comes in contact with the bottom electrode. In accordance with the structure just described a margin 21 of the high-k material adheres directly to the substrate directly surrounding the lower plate 16 which is interposed between the substrate and most of the high-k ceramic. The bond of high-k ceramic to substrate along the margin 21 is formed at a high temperature, typically at least 500 degrees centigrade, at which the high-k ceramic is fired. As the product is cooled, the high-k ceramic, which has a higher coefficient of thermal expansion, shrinks relative to the substrate and is stretched across the plate 16. The resulting tension in the high-k material tends to hinge the high-k layer 15 away from the plate at the edges 23 of the plate, or in the alternative, to cause cracking of the high-k ceramic in the neighborhood of the edges 23. These cracks quickly propagate into that portion of the high-k ceramic which overlaps the lower electrode. When the top electrode 17 is subsequently applied over the cracked high-k ceramic, metal of the top electrode may invade these cracks and tend to short out the capacitor.

Referring now to FIG. 4, laying down the improved capacitor, a base electrode metal layer 51 is laid down as in the prior art but, as shown in FIG. 4, the plate 53 covers a somewhat larger area. FIG. 5 shows the overlaying of the high-k ceramic layer 61 leaving a margin 63 of the plate 53 all around the layer 61. In FIG. 6 is shown the deposit of a crossover insulator 71 adhering to substrate 13 to metal layer 51 and to high-k ceramic 61 to cover a part of the border 72 and to establish a protected gap 73 between the exposed surface of the substrate 13. In FIG. 7 is shown the deposit of the upper electrode 81 on the high-k layer 61 again leaving the border on margin 72 all around an upper plate 83 except for a terminal tab 84 which is carried on the crossover insolator 71 to the substrate 13 providing an interconnection to other circuit elements (not shown). Finally the layer 85 of low-melting-point glass encapsulant is applied over the whole structure to provide a hermetic seal. FIG. 8 which is a section taken along the line XX of FIG. 7 with an exaggerated vertical scale shows how the successive layers 51, 61, 71, 81, and 85 are built up on the substrate 13.

FIG. 9 is a cutaway view of an alternate structure; and FIG. 10 is a section. In this embodiment the crossover of low-melting-point expansion glass such as the bisilicate glass described above forms a ring 92 all around the lower plate 93.

The high-k ceramic is laid down on top of the plate 93 as the layer 94, leaving a margin 95 of metal all around. The crossover insulation ring 92 at its outer margin fuses to the substrate 13 and along its inner margin overlaps the edge of the high-k layer. The structure is completed by the top electrode 97 applied to the top surface of the high-k layer 94, being held apart from the inner margin 98 of the high-k layer by the crossover insulator 92; and by a final encapsulating layer 99.

Using additional crossover insulators satisfactory multi-layers can be built up on the substrate giving capacitors in parallel as indicated in FIG. 11 wherein a second high-k layer 86 is deposited on the plate 83, a second crossover insulator 87 is deposited to cover a portion of the exposed edge of the plate 83 thereby separating the edge from the connecting part of a third electrode 89 connected to electrode 11 which is laid down over the second layer 86 of high-k ceramic. An encapsulating glass coating 91 is applied over the whole to complete the structure.

Capacitors as just described may be used with resistors in a countless variety of different circuits. As an example, and illustrative of a preferred embodiment of the invention is the structure of FIG. 12 wherein three B+ by-pass capacitors 101, 102 and 103 with their associated resistors 111, 112, and 113 respectively are carried on a single substrate 115.

The unfiltered B voltage from other apparatus is applied at points 117, 118 and 119, respectively. The ground connection to other interconnected apparatus is made at selected ones of points 121, 122, 123, 124, and 125. Filtered B voltage is available for connection to other apparatus at points 131, 132, and 133 or **133*a*** respectively.

The substrate 115 of aluminum oxide is ¾ of an inch long, $^{3}/_{10}$ of an inch wide and .025 inch thick.

Each of the lower electrodes 141, 142, 143 is a layer of palladium metal and has a plate portion respectively **144*a*, 144*b* and 144*c* having sufficient area to provide the desired capacitance, at least one point for connection to other apparatus, and portions respectively 145*a*, 145*b*, and 145*c*** providing interconnections between the plates and the points for connection. The metal, obtained as a powder passing a −400 mesh screen, is mixed with cellulose as a thickener and a high boiling point liquid (such as carbitol acetate) to produce a paste which may be deposited by the silk-screen process in the desired pattern of plates, terminals and interconnections. After preliminary drying the metal film is formed by firing in air at about 1300 degrees centigrade for about two hours. The organic materials are removed leaving an adherent film of metal. The film must cover the substrate solidly without leaks or bubbles and be thick enough to allow the plastic flow which, in accordance with the invention relieves the above described crack-forming stresses. A film of palladium having a weight of about 18 milligrams per square centimeter is preferred in this example. Thickness is about $^{8}/_{10}$ mil.

Over each of these palladium base plates, a layer of barium titanate is deposited. Obtained as a powder of crushed crystals milled to pass a −325 mesh screen, the material is manufactured and sold by M & T Chemical Inc., Rahway, New Jersey and designated "electronic grade." It is a high purity barium titanate and is also available from other sources.

The pure barium titanate powder is made into a paste, using (for convenience) the same cellulose thickener and carbitol acetate vehicle used for the palladium powder. Like the palladium paste the titanate paste is stencilled using a screen process in accurate registry with the palladium electrodes leaving a margin 141 all around each plate which is typically 10 mils (0.010").

This composition is dried, then fired to 1300 degrees centigrade in air for two hours and therafter cooled at a rate of a about 100 degrees centigrade per hour to form the three high-k layers 151, 152 and 153.

Next crossover insulators 161, 162 and 163 are deposited as shown covering a part of each metal margin **141*m*, 142*m*, and 143*m* and adhering as well to adjacent high-k ceramic layers 151, 152 and 153 within the margins and to the substrate 140** outside the margins. The past has weight percentages of solids as follows: 65% lead monoxide $PbO$, 1% aluminum oxide $Al_2O_3$ and 34% silica $SiO_2$. This composition is available from Hammond Lead Products Inc., Hammond, Ind. The desired bisilicate glass is formed by firing to a peak temperature of 825 degrees centigrade for 10 minutes in air followed by slow cooling.

The top electrodes 171, 172, 173 are then applied over both titanate and bisilicate crossover insulator 161 leaving exposed a 10 mil margin of titanate all around the top plates except for the interconnections **174 *a*, *b*, *c* which are carried on the crossover insulators 161, 162 and 163**. For these electrodes DuPont's 8151 silver-palladium paste is preferred. It is deposited by screening as for the other layers and is described in Bulletin CPA of E. I. duPont de Nemours & Co. (Inc.) Electrochemicals Dept., Wilmington, Del., entitled "Gold, Platinum and Palladium Preparations for Use in the Electronics Indusper mil.

This paste is printed and dried, then the resistors are printed using a palladium-glass resistor paste, preferably DuPont number 8220, nominally 20 ohms per square per mil .

The resistors 111, 112, and 113 together with the upper electrodes 151, 152, 153, are fired together to a peak temperature of 680 degrees for 10 minutes.

The final step is an encapsulation by applying the above-described bisilicate glass over the resistor and capacitor elements leaving exposed only the ends of terminals 117, 118, 119, 121, 122, 123, 124, 125, 131, 132, 133, and **133*a*** to which connections to other apparatus may be soldered.

Firing the encapsulating layer is carried to the 680 degree temperature for 10 minutes in air.

FIG. 13 is a schematic diagram of the network of FIG. 12. The resistors are of approximately 20 ohms each; the capacitors are 1000 picofarads.

It will be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

In particular it should be noted that plastics such as epoxy resins might be used for crossover insulation and encapsulant if a low temperature process is also used to apply the top electrodes.

It will be clear that the utility of the invention arises out of the large disparity in thermal expansion between the materials which have the best dielectric properties to form the body of a capacitor and the materials which are preferred as substrates for hybrid circuits. Various materials are available.

If cost is no object, beryllia may be a preferred substrate material. Almost equal to or better than alumina in all of the pertinent electrical, chemical, and mechanical properties, it has about the same thermal coefficient of expansion and almost ten times the thermal conductivity. Alumina, in turn has about five times the thermal conductivity of steatite, another popular electrical ceramic, and substrate material.

Other ceramics which might be used include fosterite, zircon, titania, cordierite and natural lava.

While the thermal expansion of some of these more closely matches the expansion of high-k materials, their thermal conductivities and resistance to thermal shock is poor; so these alternate materials ordinarily are not used as substrates for hybrid circuits.

In addition to barium titanate type high-k materials there are other high-k materials based on titanate-stannate systems. ($BaTiO_3PbSnO_3$ and $BaTiO_3$-$Bi_2(SnO_3)_{33}$) which are possible constituents, as are potassium niobate ceramics.

Palladium is relatively soft and ductile and is the cheapest of the platinum group metals. It is therefore the preferred choice for the base plate of the improved capacitor of the invention. It is of great practical importance that the contemplated firing steps in the process of producing hybrid circuits be carried out in air. Accordingly, if another metal or alloy is substituted for palladium it should be one that also resists oxidation at the titanate sintering temperature, but which will form an adherent film at the working temperatures of the substrate. In addition to palladium, platinum and alloys and combintaions of platinum-group metals with gold and silver may be formulated to have the desired properties. These metals in layers of differing compositions may be laid down one over the next and diffused together to form a cushion between high-k material and substrate that matches each at its interface and gradually changes from the expansion of the one to the other as the composition changes with depth in the film. Palladium over platinum and platinum-gold over platinum are examples.

In a controlled atmosphere or vacuum other metals may be deposited for the lower electrode; however, oxidation-reduction reactions in barium titanate critically affect the resulting capacitance. Accordingly use of other than noble metals generally complicates the fabrication of devices. Since only about four cents worth of palladium is required for a square centermeter of capacitor, the substitution of other metals will rarely be economical.

Although there are a number of metallic compositions which may be employed to form base plates, conductive glass coatings containing palladium as represented by the above mentioned DuPont number 8151 and which are preferred for the top plate, cannot be used, and are not contemplated as being "ductile" or "metallic" as the terms are used in the claims.

It will be understood that capacitors and networks having the improved structure may be made using various materials of the kinds just described in a very large number of possible combinations and permatations; and that optimum formulation of the product for use in a particular product will be a matter of design.

It is also to be understood that the following claims are intended to cover all of the generic and specific features of the invention herein described, and all statements of the scope of the invention which, as a matter of language, might be said to fall therebetween.

The embodiments of the invention in which an exclusive property or privilege is claimed are defined as follows:

1. A resistor-capacitor structure comprising:
a ceramic substrate with a first coefficient of thermal expansion,
first, second, and third electrodes having respectively first, second, and third portions providing points for attachment to other apparatus fused to the top of said substrate,
a resistive film attached to said first and second electrodes and to said substrate to provide a resistive connection between said first and second electrodes, a high-k ceramic film having a second coefficient of thermal expansion greater than said first coefficient fused on its lower face only to the top of a base plate which is a part of said first electrode, leaving a margin of said top between said high-k film and said substrate, and supporting on its upper face an electrically conducting upper plate portion of said third electrode, leaving a margin of said upper face between said upper plate and said base-plate margin, and
a cross-over insulator comprising an insulating film fastened on its lower face to adjacent portions of said substrate and said margins, and carrying a bridging portion of said third electrode fixed to said plate margin and electrically interconnecting said upper plate and third portions,
said base plate comprising a ductile body of metal.

2. A structure as defined by claim 1, wherein said substrate is a ceramic body of a composition comprising essentially oxides of metals of the group consisting of beryllium and aluminum.

3. A structure as defined by claim 1 wherein said metal is of the group consisting of platinum and palladium.

4. A structure as defined by claim 1 wherein said base plate comprises a platinum-rich layer adherent to said substrate and a palladium-rich layer adherent to said high-k film.

5. A structure as defined by claim 1 wherein said base plate comprises a layer consisting essentially of metals of the platinum group adherent to said substrate and on an upper layer substantially alloyed with metals of the group consisting of gold and silver adherent to said high-k film.

6. A structure as defined by claim 1 wherein said high-k film comprises ferroelectric crystals of the group consisting of titanates of barium and strontium, stannates of bismuth and lead and niobates of potassium and sodium.

7. A structure as defined by claim 2 wherein said resistive film and said third electrode both comprise vitreous preparations fused to their respective supporting structures.

8. A structure as defined by claim 7 wherein said preparations comprise glass and palladium metal.

9. A structure as defined by claim 3 wherein said resistive film and said third electrode both comprise vitreous preparations fused to their respective supporting structures.

10. A structure as defined by claim 9 wherein said resistive film and said third electrode both comprise said metal.

11. A structure as defined by claim 10 wherein said metal is palladium.

12. A capacitor comprising:
a ceramic substrate with a first coefficient of thermal expansion,
a first electrode fixed to the top of said substrate having a first terminal portion providing a point for attachment to other apparatus and a base plate portion, said plate portion consisting of a ductile film of metal,
a high-k ceramic film with a second coefficient of expansion greater than said first coefficient fused over its lower surface only to the top of said plate portion, leaving a margin of said plate top between said high-k film and said substrate,
a second electrode comprising an upper plate, fixed to the upper surface of said ceramic film and situated to leave a border of said film upper surface around said top plate, a second terminal portion fixed to said substrate spaced apart by a gap from said margin, and a bridging portion,
a thin cross-over insulator extending from said second terminal portion to said plate, fixed to and covering adjacent parts of said margin, border, and gap and carrying said bridging portion of said second electrode spaced apart by said insulator from said first electrode and electrically interconnecting said second terminal portion and said top plate.

13. A capacitor as defined by claim 12 wherein said insulator covers substantially all of said base plate margin.

14. A capacitor as defined by claim 12 wherein said ductile film is a composition comprising a substantial proportion of metals of the platinum group.

15. A capacitor as defined by claim 12 wherein said substrate comprises a ceramic of a composition comprising essentially oxides of metals of the group consisting of beryllium and aluminum.

16. A capacitor as defined by claim 14 wherein said high-k film comprises ferroelectric crystals of the group consisting of titanates of barium and strontium, stannates of bismuth and lead and niobates of potassium and sodium.

17. A capacitor as defined by claim 16 wherein said metal is substantially palladium.

18. A thick-film, hybrid circuit structure comprising:
a ceramic substrate with a first coefficient of thermal expansion,
a permanently interconnected network of conductive and resistive parts fired to the top side of said substrate to form a circuit comprising at least one resistor, one capacitor, and interconnections, characterized in that:
said capacitor comprises;
a base plate fixed to said substrate, said plate consisting of a ductile film of metal,
a high-k ceramic film with a second coefficient of expansion greater than said first coefficient fuzed over its lower surface only to the top of said plate, leaving a margin of said plate top between said high-k and said substrate, and
a conductive top plate, fixed to the upper surface of said ceramic film and situated to leave a border of said upper surface around said top plate.

19. A structure as defined by claim 18 wherein said ductile film is of a composition comprising a substantial proportion of metals of the platinum group.

20. A structure as defined by claim 18 wherein said metal is of the group consisting of platinum and palladium.

21. A structure as defined by claim 18 wherein said base plate comprises a layer consisting essentially of metals of the platinum group adherent to said substrate and of an upper layer substantially alloyed with metals of the group consisting of gold and silver, adherent to said high-k film.

22. A structure as defined by claim 19 wherein said substrate is a ceramic body of a composition comprising essentially oxides of metals of the group consisting of beryllium and aluminum and said high-k film comprises ferroelectric crystals of the group consisting of titanates of barium and strontium, stannates of bismuth and lead and niobates of potassium and sodium.

References Cited

UNITED STATES PATENTS 2,972,570 2/1961 Haas.
3,394,290 7/1968 Boykin ------------ 317—258

OTHER REFERENCES

IBM Tech. Disclosure vol. 3, No. 7, December 1960, p. 32.

E. A. GOLDBERG, Primary Examiner

U.S. Cl. X.R.

317—101, 258, 261